(12) United States Patent
Sandler et al.

(10) Patent No.: US 12,085,486 B2
(45) Date of Patent: Sep. 10, 2024

(54) SYSTEMS AND METHODS FOR CONTAINER-BASED DATA COLLECTION AND ANALYSIS IN AN OPERATIONAL TECHNOLOGY NETWORK

(71) Applicant: Rockwell Automation Technologies, Inc., Mayfield Heights, OH (US)

(72) Inventors: Nathaniel S. Sandler, Chagrin Falls, OH (US); Rob A. Entzminger, Shawnee, KS (US); Chris Softley, Midlothian (GB); Patrick E. Ozimek, Mequon, WI (US); Michael J. Anthony, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/955,095

(22) Filed: Sep. 28, 2022

(65) Prior Publication Data

US 2024/0102890 A1    Mar. 28, 2024

(51) Int. Cl.
  *G06F 11/30*  (2006.01)
  *G01M 99/00*  (2011.01)
  *G05B 23/02*  (2006.01)

(52) U.S. Cl.
  CPC ....... *G01M 99/005* (2013.01); *G05B 23/0243* (2013.01)

(58) Field of Classification Search
  CPC ................................................. G01M 99/005
  See application file for complete search history.

(56) References Cited

U.S. PATENT DOCUMENTS

| | | | |
|---|---|---|---|
| 10,715,388 | B2 | 7/2020 | Fildebrandt et al. |
| 11,182,206 | B2 | 11/2021 | Jung et al. |
| 11,474,873 | B2 | 10/2022 | Biernat et al. |
| 11,513,877 | B2 | 11/2022 | Biernat et al. |
| 2012/0210158 | A1 | 8/2012 | Akiyama et al. |

(Continued)

FOREIGN PATENT DOCUMENTS

| | | | |
|---|---|---|---|
| EP | 3104235 B1 | | 3/2019 |
| KR | 20200027783 A | * | 3/2022 |

(Continued)

OTHER PUBLICATIONS

Extended European Search Report for European Patent Application No. 21179775.8, dated Nov. 25, 2021, 9 pages.

(Continued)

*Primary Examiner* — Phuong Huynh
(74) *Attorney, Agent, or Firm* — Fletcher Yoder P.C.

(57) ABSTRACT

A non-transitory computer-readable medium stores instructions that, when executed by a processor, cause the processor to receive, via the processor, a characteristic of data to be collected from an operational technology (OT) device disposed within an OT network associated with an industrial automation system configured to perform an industrial automation process, determine, via the processor, that the characteristic exceeds a threshold value, and deploy, via the processor, in response to determining that the characteristic exceeds the threshold value, a container to a compute surface within the OT network that is disposed within a threshold distance of the OT device. The container is configured to receive the data from the OT device and process the received data.

16 Claims, 6 Drawing Sheets

(56) References Cited

U.S. PATENT DOCUMENTS

| | | |
|---|---|---|
| 2016/0284073 A1 | 9/2016 | Michalscheck et al. |
| 2018/0024537 A1 | 1/2018 | Chauvet et al. |
| 2018/0054469 A1 | 2/2018 | Simoncelli |
| 2019/0377604 A1 | 12/2019 | Cybulski |
| 2020/0136906 A1 | 4/2020 | Bernat et al. |
| 2020/0249928 A1 | 8/2020 | Zeng et al. |
| 2020/0278892 A1 | 9/2020 | Nainar et al. |
| 2020/0311617 A1 | 10/2020 | Swan et al. |
| 2021/0089354 A1 | 3/2021 | Nixon et al. |
| 2021/0200814 A1 | 7/2021 | Tal et al. |
| 2021/0218617 A1 | 7/2021 | Palavalli et al. |
| 2021/0382727 A1 | 12/2021 | Vigil et al. |
| 2022/0027217 A1 | 1/2022 | Thoemmes et al. |
| 2022/0046209 A1 | 2/2022 | Takahaski et al. |
| 2022/0091572 A1 | 3/2022 | Biernat et al. |

FOREIGN PATENT DOCUMENTS

| | | | | |
|---|---|---|---|---|
| WO | 2015047121 A1 | 4/2015 | | |
| WO | WO-2018189751 A1 * | 10/2018 | ............. | F04D 13/06 |
| WO | WO-2020184362 A1 * | 9/2020 | ............ | G06F 9/5011 |

OTHER PUBLICATIONS

Partial European Search Report for European Patent Application No. 21180068.5, dated Dec. 8, 2021, 17 pages.

Marshall, "Industry 4.0: The PLC evolves from Controller to Cloud Interface," Feb. 9, 2018, https://www.rs-online.com/designspark/evolution-of-the-industrial-picfrom-controller-to-cloud-interface , retrieved on Nov. 29, 2021, pp. 1-6.

European Search Report for European Patent Application No. 21180068.5, dated Mar. 28, 2022, 19 Pages.

Anonymous, "Pull an Image from a Private Registry", Kubernetes, retrieved on Mar. 18, 2022, 5 Pages, https://web.archive.org/web/20171003051312/https://kubernetes.io/docs/tasks/configure-pod-container/pull-image-private-registry/.

European Search Report for European Patent Application No. 21180279.8, dated Apr. 19, 2022, 12 Pages.

D. Elliott, C. Otero, M. Ridley and X. Merino, "A Cloud-Agnostic Container Orchestrator for Improving Interoperability," 2018 IEEE 11th International Conference on Cloud Computing (CLOUD), 2018, pp. 958-961, doi: 10.1109/CLOUD.2018.00145. (Year: 2018).

A. Khan, "Key Characteristics of a Container Orchestration Platform to Enable a Modern Application," in IEEE Cloud Computing, vol. 4, No. 5, pp. 42-48, Sep./Oct. 2017, doi: 10.1109/MCC.2017.4250933. (Year: 2017).

Extended European Search Report for Application No. 23198474.1 mailed Feb. 27, 2024, 10 pages.

Liu, Y. et al., "A Data-Centric Internet of Things Framework Based on Azure Cloud," IEEE Access, vol. 7, Mar. 27, 2019, 20 pages.

* cited by examiner

SYSTEMS AND METHODS FOR CONTAINER-BASED DATA COLLECTION AND ANALYSIS IN AN OPERATIONAL TECHNOLOGY NETWORK

BACKGROUND

The present disclosure generally relates to systems and methods for implementing a container orchestration system in an operational technology (OT) network associated with one or more industrial automation systems. More particularly, embodiments of the present disclosure are related to systems and methods for leveraging container orchestration systems to collect and analyze data from OT devices.

Industrial automation systems are managed and operated using automation control and monitoring systems (e.g., industrial control systems), particularly in industrial automation environments. Such applications may include controlling a wide range of components, such as valves, electric motors, and so forth, and the collection of data via sensors. Typical industrial control systems may include one or more components, such as programming terminals, automation controllers, input/output (I/O) modules, communication networks, human-machine interface (HMI) terminals, and the like.

Generally, industrial control systems operate in the OT environment are used to control industrial devices accessible via an OT network. However, for tasks that occur at high speed and/or high frequency, communication latencies involved in collecting data from data sources and communicating the collected data long distances within the OT network for processing and/or analysis may make it challenging for the industrial control system to optimize control of the industrial devices. Accordingly, improved systems and methods for collecting and analyzing data within an OT network are desired.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system includes a plurality of devices configured to perform one or more operations within an industrial automation system and a processor. Each device of the plurality of devices includes a compute surface configured to perform one or more software tasks. The processor is configured to receive an alert associated with the one or more operations, identify a portion of the plurality of devices that include respective data sources to acquire data related to the alert, and send a data acquisition container to each device of the portion of the plurality of devices, such that each data acquisition container is configured to acquire the respective dataset from the respective data source of the respective device in the respective portion of the plurality of devices.

In another embodiment, a non-transitory computer-readable medium stores instructions that, when executed by a processor, cause the processor to receive, via the processor, a characteristic of data to be collected from an operational technology (OT) device disposed within an OT network associated with an industrial automation system configured to perform an industrial automation process, determine, via the processor, that the characteristic exceeds a threshold value, and deploy, via the processor, in response to determining that the characteristic exceeds the threshold value, a container to a compute surface within the OT network that is disposed within a threshold distance of the OT device. The container is configured to receive the data from the OT device and process the received data.

In a further embodiment, a method includes receiving, via a processor, a characteristic of data to be collected from an operational technology (OT) device disposed within an OT network associated with an industrial automation system configured to perform an industrial automation process, determining, via the processor, that the characteristic exceeds a threshold value, and deploying, via the processor, a container to a compute surface within the OT network that is within a threshold distance of the OT device and is configured to receive the data from the OT device, process the received data, diagnose a condition of the OT device based on the processed received data, and identify a remedial action to address the condition of the OT device based on the processed received data, the condition, or both.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
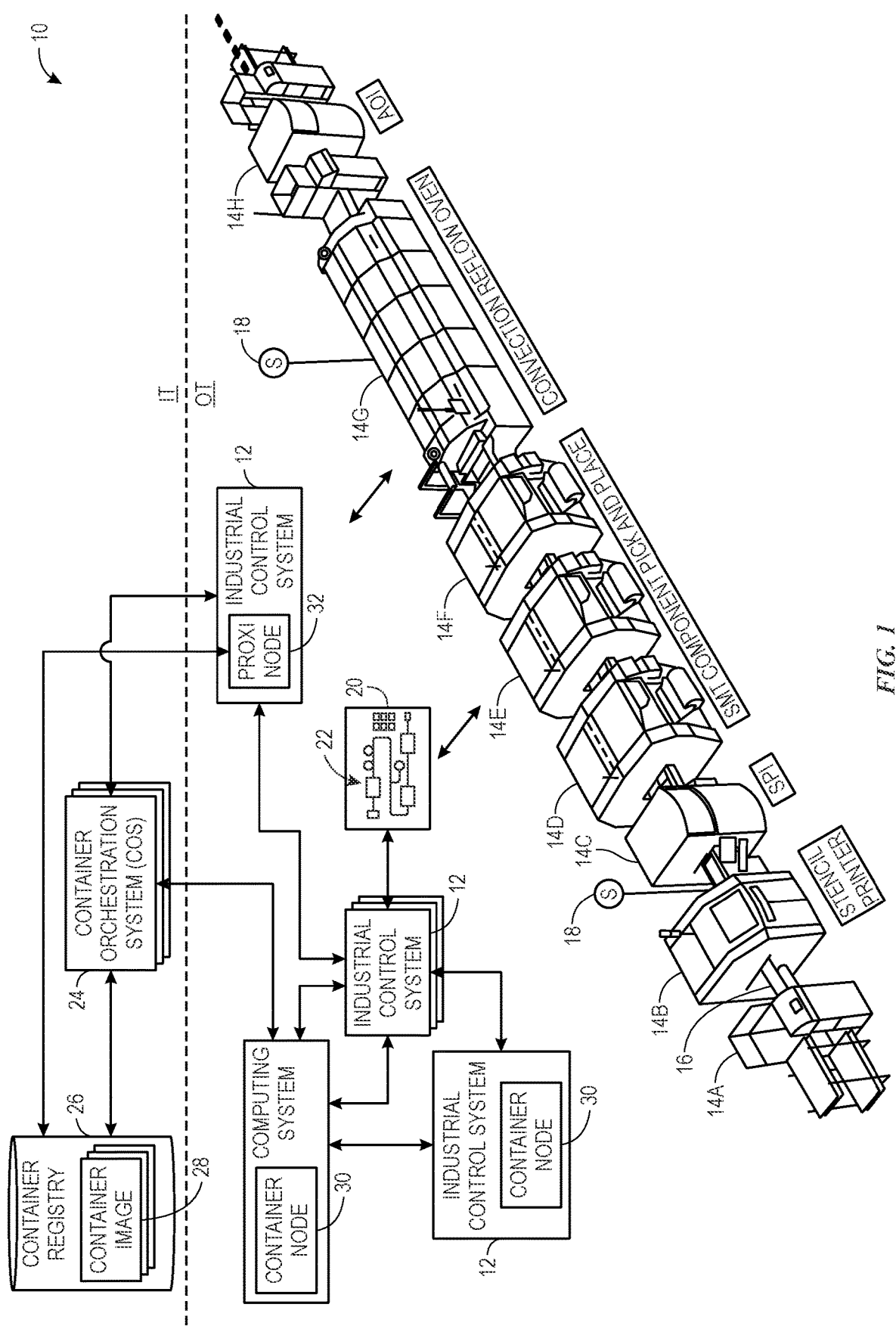
FIG. 1 is a perspective view of an example industrial automation system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are generally directed toward analyzing a characteristic of data to be collected from an OT device within an OT network and, if the characteristic exceeds a threshold value, deploying one or more containers to one or more compute surfaces within a threshold distance of the OT device. In some cases, the characteristic may be identified by, or otherwise determined based on, an alert generated by the OT device, a controller, an application-specific container, etc. The characteristic may include a number of data points, a frequency indicated by one or more data points, a frequency of collection, a sampling rate, a time constant of a control loop, a time period for feedback, and so forth. Once deployed, the container may be configured to collect data from the OT device and analyze the collected data. The analysis may involve, for example, generating a motor signature, or performing other analysis. In some cases, the container may pre-process or partially process the data and then transmit the pre-processed or partially processed data to another compute surface, such as an edge device or a server for additional processing. In other cases, the processing/analysis may be performed entirely by the container. The container and/or the additional compute surface may diagnose a condition of the OT device and identify one or more remedial actions to address the condition. In some embodiments, the one or more remedial actions may be provided to a user for approval and/or manual performance. In other embodiments, the remedial actions may be automatically performed. After the condition has been resolved, if the container has completed its intended/assigned tasks, the container may be spun down or otherwise stopped.

In some embodiments, container functions may be deployed to different locations or devices based on the type of information that is being collected. For example, for container functions that may perform tasks at a high speed or frequency, the respective containers may be deployed to devices closest to the source of the data to reduce the communication latencies involved with transmitting and receiving the acquired/sampled data. With this in mind, certain data operations that may not involve high frequency data. As such, container functions may be deployed further away from a data source. For instance, data acquired at some rate greater than a threshold (e.g., every 10 milliseconds) may be processed using a container deployed in edge devices. In this way, containers may be deployed to compute surfaces to efficiently process the acquired data, while maximizing the computational resources of the respective compute surfaces. As a result, the container deployment system may maximize the available compute space by pushing functions to locations or spaces that are capable of performing tasks that are uniquely identified for the respective space.

Keeping this in mind, by way of example, the container deployment system may receive an alert that may be related to the operation of a motor. As such, a motor operation signature may be useful to help troubleshoot the issue by obtaining phase A, B, C and ground current measurements. The container deployment system may deploy containers to compute surfaces that are within a certain proximity of the respective data sources. As such, the deployed container may acquire high frequency data for a period of time and perform some initial analysis of the acquired data to determine a motor signature. The container may then forward the analyzed data to an edge device for categorizing or classifying the signature to assess or correlate the signature to known events (e.g., broken rotor bar, bearings wear). Data acquisition containers for any suitable analog or floating point values may acquire useful information related solving an issue, but the computing resources associated with these containers may prove to be high. As such, the container deployment system may deploy these containers for assistance in resolving certain issues. For instance, machine jams, capping anomalies (e.g., threaded on correctly, with correct torque), and other situations may benefit from high frequency data acquisition to quickly resolve the issue. Indeed, as machine speeds, or any other process variables increase, patterns within the acquired data may be identified at higher frequencies.

Moreover, some application specific containers may perform specific types of functions (e.g., artificial lifts) for a consumer. Since these types of containers may not be used by most consumers, the containers often rely on shared data sources to obtain data used for performing the respective function. However, the shared data sources (e.g., database, storage) may not provide a sufficient level of detail or granularity to effectively perform the function. With this in mind, the container deployment system may coordinate with the application specific container to deploy data acquisition containers closer to the respective data sources to acquire data that may be passed directly to the application specific container.

In addition, total cost of ownership (TCO) statistics may be acquired by monitoring the operations of various devices and the replacement options that were previously offered, that is currently being offered, or the like by deploying containers to monitor costs associated with various device operations. In the same manner, energy costs may be tracked and reported via containers.

In some embodiments, the container deployment system may generate a visualization that may provide a visual indication of any detected alert and provide options with regard to locations in which certain containers may be deployed to assist in resolving the issue. Indeed, the container deployment system may also provide a list of options for the types of containers that may be useful in resolving or attempting to resolve the detected issue. The visualization may provide a user the ability to manage the deployment of any of the tasks described above as well.

Additional details will be discussed below with reference to FIGS. 1-8.

By way of introduction, FIG. 1 is a perspective view of an example industrial automation system 10 controlled by one or more industrial control systems 12. The industrial automation system 10 includes stations 14A through 14H having machine components and/or machines to conduct functions within an automated process, such as silicon wafer manufacturing, as is depicted. The automated process may begin at a station 14A used for loading objects, such as substrates, into the industrial automation system 10 via a conveyor section 16. The conveyor section 16 may transport the objects to a station 14B to perform a first action, such a printing solder paste to the substrate via stenciling. As objects exit from the station 14B, the conveyor section 16 may transport the objects to a station 14C for solder paste inspection (SPI) to inspect printer results, to a station 14D, 14E, and 14F for surface mount technology (SMT) component placement, to a station 14G for convection reflow oven to melt the solder to make electrical couplings, and finally to a station 14H for automated optical inspection (AOI) to inspect the object manufactured (e.g., the manufactured printed circuit board). After the objects proceed through the various stations, the objects may be removed from the station 14H, for example, for storage in a warehouse or for shipment. Clearly, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of operational technology (OT) data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 14A through 14H, may be monitored and controlled by the industrial control systems 12 for regulating control variables. For example, sensing devices (e.g., sensors 18) may monitor various properties of the industrial automation system 10 and may be used by the industrial control systems 12 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 12 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 12 may be communicatively coupled to a display/operator interface 20 (e.g., a human-machine interface (HMI)) and to devices of the industrial automation system 10. It should be understood that any suitable number of industrial control systems 12 may be used in a particular industrial automation system 10 embodiment. The industrial control systems 12 may facilitate representing components of the industrial automation system 10 through programming objects that may be instantiated and executed to provide simulated functionality similar or identical to the actual components, as well as visualization of the components, or both, on the display/operator interface 20. The programming objects may include code and/or instructions stored in the industrial control systems 12 and executed by processing circuitry of the industrial control systems 12. The processing circuitry may communicate with memory circuitry to permit the storage of the component visualizations.

As illustrated, a display/operator interface 20 depicts representations 22 of the components of the industrial automation system 10. The industrial control system 12 may use data transmitted by sensors 18 to update visualizations of the components via changing one or more statuses, states, and/or indications of current operations of the components. These sensors 18 may be any suitable device adapted to provide information regarding process conditions. Indeed, the sensors 18 may be used in a process loop (e.g., control loop) that may be monitored and controlled by the industrial control system 12. As such, a process loop may be activated based on process inputs (e.g., an input from the sensor 18) or direct input from a person via the display/operator interface 20. The person operating and/or monitoring the industrial automation system 10 may reference the display/operator interface 20 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 18 may gather OT data indicative of one or more operations of the industrial automation system 10 or the industrial control system 12. In this way, the OT data may be analog data or digital data indicative of measurements, statuses, alarms, or the like associated with operation of the industrial automation system 10 or the industrial control system 12.

The industrial control systems 12 described above may operate in an OT space in which OT data is used to monitor and control OT assets, such as the equipment illustrated in the stations 14A through 14H of the industrial automation system 10 or other industrial equipment. The OT space, environment, or network generally includes direct monitoring and control operations that are coordinated by the industrial control system 12 and a corresponding OT asset. For example, a programmable logic controller (PLC) may operate in the OT network to control operations of an OT asset (e.g., drive, motor). The industrial control systems 12 may be specifically programmed or configured to communicate directly with the respective OT assets.

A container orchestration system 24, on the other hand, may operate in an information technology (IT) environment. That is, the container orchestration system 24 may include a cluster of multiple computing devices that coordinates an automatic process of managing or scheduling work of individual containers for applications within the computing devices of the cluster. In other words, the container orchestration system 24 may be used to automate various tasks at scale across multiple computing devices. By way of example, the container orchestration system 24 may automate tasks such as configuring and scheduling deployment of containers, provisioning and deploying containers, determining availability of containers, configuring applications in terms of the containers that they run in, scaling of containers to equally balance application workloads across an infrastructure, allocating resources between containers, performing load balancing, traffic routing, and service discovery of containers, performing health monitoring of containers, securing the interactions between containers, and the like. In any case, the container orchestration system 24 may use configuration files to determine a network protocol to facilitate communication between containers, a storage location to save logs, and the like. The container orchestration system 24 may also schedule deployment of containers into clusters and identify a host (e.g., node) that may be best suited for executing the container. After the host is identified, the container orchestration system 24 may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 26 as container images 28. The container registry 26 may be any suitable data storage or database that may be accessible to the container orchestration system 24. The container image 28 may correspond to an executable software package that includes the tools and data employed to execute a respective application. That is, the container image 28 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 24. The deployment configuration file may be stored in the container registry 26 along with the respective container images 28 associated with the deployment configuration file. The deployment configuration file may include a list of different pods and a number of replicas for each pod that should be operating within the container orchestration system 24 at any given time. Each pod may correspond to a logical unit of an application, which may be associated with one or more containers. The container orchestration system 24 may coordinate the distribution and execution of the pods listed in the deployment configuration file, such that the desired state is continuously met. In some embodiments, the container orchestration system 24 may include a master node that retrieves the deployment configuration files from the container registry 26, schedules the deployment of pods to the connected nodes, and ensures that the desired state specified in the deployment configuration file is met. For instance, if a pod stops operating on one node, the master node may receive a notification from the respective worker node that is no longer executing the pod and deploy the pod to another worker node to ensure that the desired state is present across the cluster of nodes.

As mentioned above, the container orchestration system 24 may include a cluster of computing devices, computing systems, or container nodes that may work together to achieve certain specifications or states, as designated in the respective container. In some embodiments, container nodes 30 may be integrated within industrial control systems 12 as shown in FIG. 1. That is, container nodes 30 may be implemented by the industrial control systems 12, such that they appear as worker nodes to the master node in the container orchestration system 24. In this way, the master node of the container orchestration system 24 may send commands to the container nodes 30 that are also configured to perform applications and operations for the respective industrial equipment.

With this in mind, the container nodes 30 may be integrated with the industrial control systems 12, such that they serve as passive-indirect participants, passive-direct participants, or active participants of the container orchestration system 24. As passive-indirect participants, the container nodes 30 may respond to a subset of all of the commands that may be issued by the container orchestration system 24. In this way, the container nodes 30 may support limited container lifecycle features, such as receiving pods, executing the pods, updating a respective filesystem to included software packages for execution by the industrial control system 12, and reporting the status of the pods to the master node of the container orchestration system 24. The limited features implementable by the container nodes 30 that operate in the passive-indirect mode may be limited to commands that the respective industrial control system 12 may implement using native commands that map directly to the commands received by the master node of the container orchestration system 24. Moreover, the container node 30 operating in the passive-indirect mode of operation may not be capable to push the packages or directly control the operation of the industrial control system 12 to execute the package. Instead, the industrial control system 12 may periodically check the file system of the container node 30 and retrieve the new package at that time for execution.

As passive-direct participants, the container nodes 30 may operate as a node that is part of the cluster of nodes for the container orchestration system 24. As such, the container node 30 may support the full container lifecycle features. That is, container node 30 operating in the passive-direct mode may unpack a container image and push the resultant package to the industrial control system 12, such that the industrial control system 12 executes the package in response to receiving it from the container node 30. As such, the container orchestration system 24 may have access to a worker node that may directly implement commands received from the master node onto the industrial control system 12.

In the active participant mode, the container node 30 may include a computing module or system that hosts an operating system (e.g., Linux) that may continuously operate a container host daemon that may participate in the management of container operations. As such, the active participant container node 30 may perform any operations that the master node of the container orchestration system 24 may perform. By including a container node 30 operating in the OT space, the container orchestration system 24 is capable of extending its management operations into the OT space. That is, the container node 30 may provision devices in the OT space, serve as a proxy node 32 to provide bi-directional coordination between the IT space and the OT space, and the like. For instance, the container node 30 operating as the proxy node 32 may intercept orchestration commands and cause industrial control system 12 to implement appropriate machine control routines based on the commands. The industrial control system 12 may confirm the machine state to the proxy node 32, which may then reply to the master node of the container orchestration system 24 on behalf of the industrial control system 12.

Additionally, the industrial control system 12 may share an OT device tree via the proxy node 32. As such, the proxy node 32 may provide the master node with state data, address data, descriptive metadata, versioning data, certificate data, key information, and other relevant parameters concerning the industrial control system 12. Moreover, the proxy node 32 may issue requests targeted to other industrial control systems 12 to control other OT devices. For instance, the proxy node 32 may translate and forward commands to a target OT device using one or more OT communication protocols, may translate and receive replies from the OT devices, and the like. As such, the proxy node 32 may perform health checks, provide configuration updates, send firmware patches, execute key refreshes, and other OT operations for other OT devices.

Figure 2:
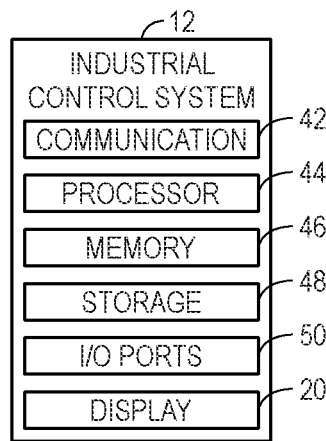
FIG. 2 is a block diagram of an example industrial control system, in accordance with an embodiment.

With the foregoing in mind, FIG. 2 is a block diagram of an example industrial control system 12 that may be used with the embodiments described herein. The industrial control system 12 may include a communication component 42, a processor 44, a memory 46, a storage 48, input/output (I/O) ports 50, a display 20, and the like. The communication component 42 may be a wireless or wired communication component that facilitates communication between the container orchestration system 24 and the industrial control system 12, or any other suitable electronic device. The processor 44 may be any type of computer processor or microprocessor capable of executing computer-executable code. The processor 44 may also include multiple processors that may perform the operations described below.

The memory 46 and the storage 48 may be any suitable article of manufacture that may serve as media to store processor-executable code, data, or the like. These articles of manufacture may represent computer-readable media (i.e., any suitable form of memory or storage) that may store the processor-executable code used by the processor 44 to perform the presently disclosed techniques. The memory 46 and the storage 48 may represent non-transitory computer-readable media (e.g., any suitable form of memory or storage) that may store the processor-executable code used by the processor 44 to perform various techniques described herein. It should be noted that non-transitory merely indicates that the media is tangible and not a signal.

The I/O ports 50 may couple to one or more sensors 18, one or more input devices, one or more displays, or the like to facilitate human or machine interaction with the industrial control system 12. For example, based on a notification provided to a user via a display 20, the user may use an input device to instruct the adjustment of an OT device.

The display 20, as discussed above, may operate to depict visualizations associated with software or executable code being processed by the processor 44. In one embodiment, the display 20 may be a touch display capable of receiving inputs from a user of the industrial control system 12. The display 20 may be any suitable type of display, such as a liquid crystal display (LCD), plasma display, or an organic light emitting diode (OLED) display, for example. Additionally, in one embodiment, the display 20 may be provided in conjunction with a touch-sensitive mechanism (e.g., a touch screen) that may function as part of a control interface for the industrial control system 12.

Although FIG. 2 is depicted with respect to the industrial control system 12, it should be noted that the container orchestration system 24, the container nodes 30, and the proxy node 32 may also include the same or similar components to perform, or facilitate performing, the various techniques described herein. Moreover, it should be understood that the components described with respect to FIG. 2 are exemplary figures and the industrial control system 12 and other suitable computing systems may include additional or fewer components as detailed above.

Figure 3:
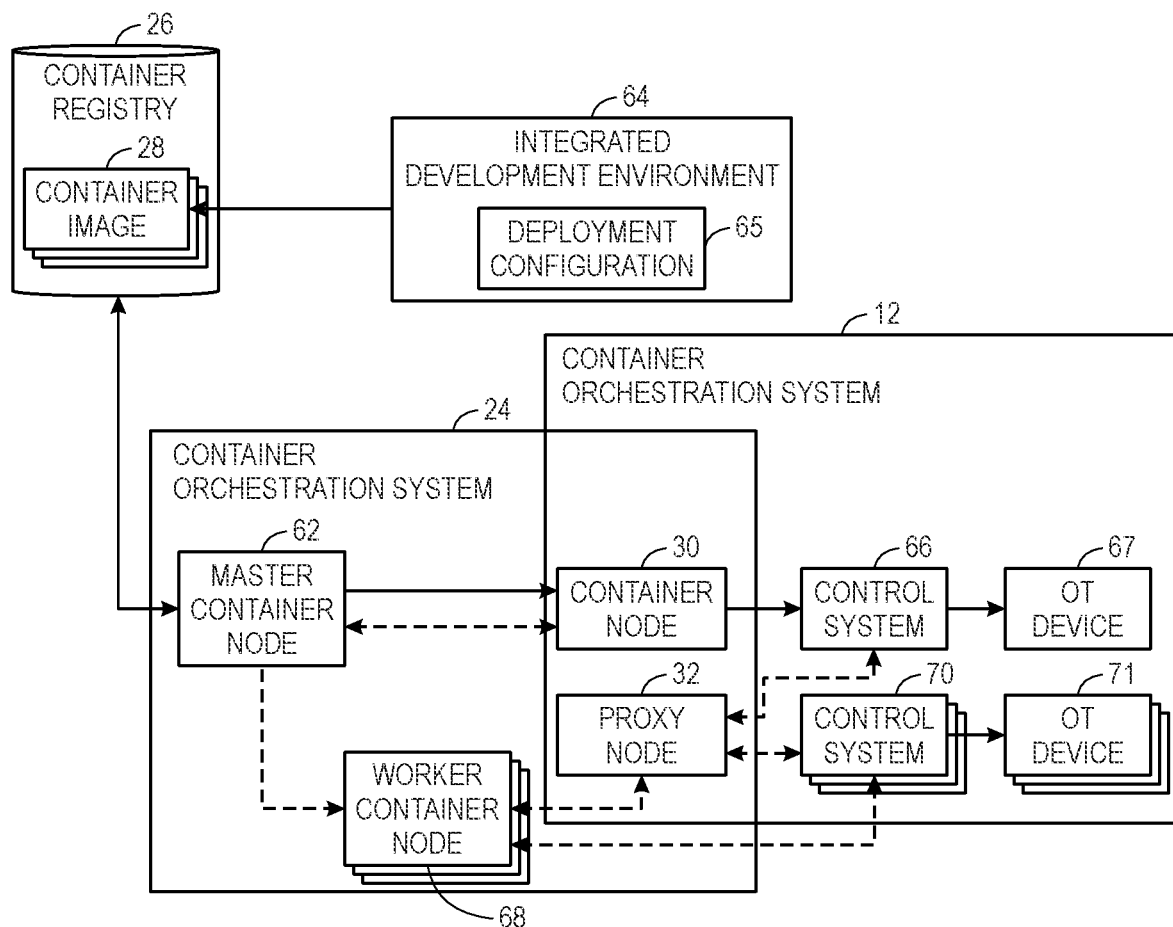
FIG. 3 is a block diagram of an example operational technology (OT) network that coordinates with a container orchestration system, in accordance with an embodiment.

With the foregoing in mind, FIG. 3 illustrates a block diagram that depicts the relative positions of the container node 30 and the proxy node 32 with respect to the container orchestration system 24. As mentioned above, the container orchestration system 24 may include a collection of nodes that are used to achieve a desired state of one or more containers across multiple nodes. As shown in FIG. 3, the container orchestration system 24 may include a master node 62 that may execute control plane processes for the container orchestration system 24. The control plane processes may include the processes that enable the container orchestration system 24 to coordinate operations of the container nodes 30 to meet the desired states. As such, the master container node 62 may execute an applications programming interface (API) for the container orchestration system 24, a scheduler component, core resource controllers, and the like. By way of example, the master container node 62 may coordinate all of the interactions between nodes of the cluster that make up the container orchestration system 24. Indeed, the master container node 62 may be responsible for deciding the operations that will run on container nodes 30 including scheduling workloads (e.g., containerized applications), managing the workloads' lifecycle, scaling, and upgrades, managing network and storage resources for the workloads, and the like. The master container node 62 may run an API server to handle requests and status updates received from the container nodes 30.

By way of operation, an integrated development environment (IDE) tool 64 may be used by an operator to develop a deployment configuration file 65. As mentioned above, the deployment configuration file 65 may include details regarding the containers, the pods, constraints for operating the containers/pods, and other information that describe a desired state of the containers specified in the deployment configuration file 65. In some embodiments, the deployment configuration file 65 may be generated in a YAML file, a JSON file, or other suitable file format that is compatible with the container orchestration system 24. After the IDE tool 64 generates the deployment configuration file 65, the IDE tool 64 may transmit the deployment configuration file 65 to the container registry 26, which may store the file along with container images 28 representative of the containers stored in the deployment configuration file 65.

In some embodiments, the master container node 62 may receive the deployment configuration file 65 via the container registry 26, directly from the IDE tool 64, or the like. The master container node 62 may use the deployment configuration file 65 to determine a location to gather the container images 28, determine communication protocols to use to establish networking between container nodes 30, determine locations for mounting storage volumes, locations to store logs for the containers, and the like.

Based on the desired state provided in the deployment configuration file 65, the master container node 62 may deploy containers to the container host nodes 30. That is, the master container node 62 may schedule the deployment of a container based on constraints (e.g., CPU or memory availability) provided in the deployment configuration file 65. After the containers are operating on the container nodes 30, the master container node 62 may manage the lifecycle of the containers to ensure that the containers specified by the deployment configuration file 65 is operating according to the specified constraints and the desired state.

Keeping the foregoing in mind, the industrial control system 12 may not use an operating system (OS) that is compatible with the container orchestration system 24. That is, the container orchestration system 24 may be configured to operate in the IT space that involves the flow of digital information. In contrast, the industrial control system 12 may operate in the OT space that involves managing the operation of physical processes and the machinery used to perform those processes. For example, the OT space may involve communications that are formatted according to OT communication protocols, such as FactoryTalk LiveData, EtherNet/IP, Common Industrial Protocol (CIP), OPC Direct Access (e.g., machine to machine communication protocol for industrial automation developed by the OPC Foundation), OPC Unified Architecture (OPCUA), or any suitable OT communication protocol (e.g. DNP3, Modbus, Profibus, LonWorks, DALI, BACnet, KNX, EnOcean). Because the industrial control systems 12 operate in the OT space, the industrial control systems may not be capable of implementing commands received via the container orchestration system 24.

In certain embodiments, the container node 30 may be programmed or implemented in the industrial control system 12 to serve as a node agent that can register the industrial control system 12 with the master container node 62. The node agent may or may not be the same as the proxy node 32 shown in FIG. 1. For example, the industrial control system 12 may include a programmable logic controller (PLC) that cannot support an operating system (e.g., Linux) for receiving and/or implementing requested operations issued by the container orchestration system 12. However, the PLC may perform certain operations that may be mapped to certain container events. As such, the container node 30 may include software and/or hardware components that may map certain events or commands received from the master container node 62 into actions that may be performed by the PLC. After converting the received command into a command interpretable by the PLC, the container node 30 may forward the mapped command to the PLC that may implement the mapped command. As such, the container node 30 may operate as part of the cluster of nodes that make up the container orchestration system 24, while a control system 66 (e.g., PLC) that coordinates the OT operations for an OT device 67 in the industrial control system 12. The control system 66 may include a controller, such as a programmable logic controller (PLC), a programmable automation controller (PAC), or any other controller that may monitor, control, and operate an industrial automation device or component.

The industrial automation device or component may correspond to an OT device 67. The OT device 67 may include any suitable industrial device that operates in the OT space. As such, the OT device 67 may be involved in adjusting physical processes being implemented via the industrial system 10. In some embodiments, the OT device 67 may include motor control centers, motors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.) and the like. In addition, the OT device 67 may also be related to various industrial equipment such as mixers, machine conveyors, tanks, skids, specialized original equipment manufacturer machines, and the like. The OT device 67 may also be associated with devices used by the equipment such as scanners, gauges, valves, flow meters, and the like. In one embodiment, every aspect of the OT device 67 may be controlled or operated by the control system 66.

In the present embodiments described herein, the control system 66 may thus perform actions based on commands received from the container node 30. By mapping certain container lifecycle states into appropriate corresponding actions implementable by the control system 66, the container node 30 enables program content for the industrial control system 12 to be containerized, published to certain registries, and deployed using the master container node 62, thereby bridging the gap between the IT-based container orchestration system 24 and the OT-based industrial control system 12.

Figure 4:
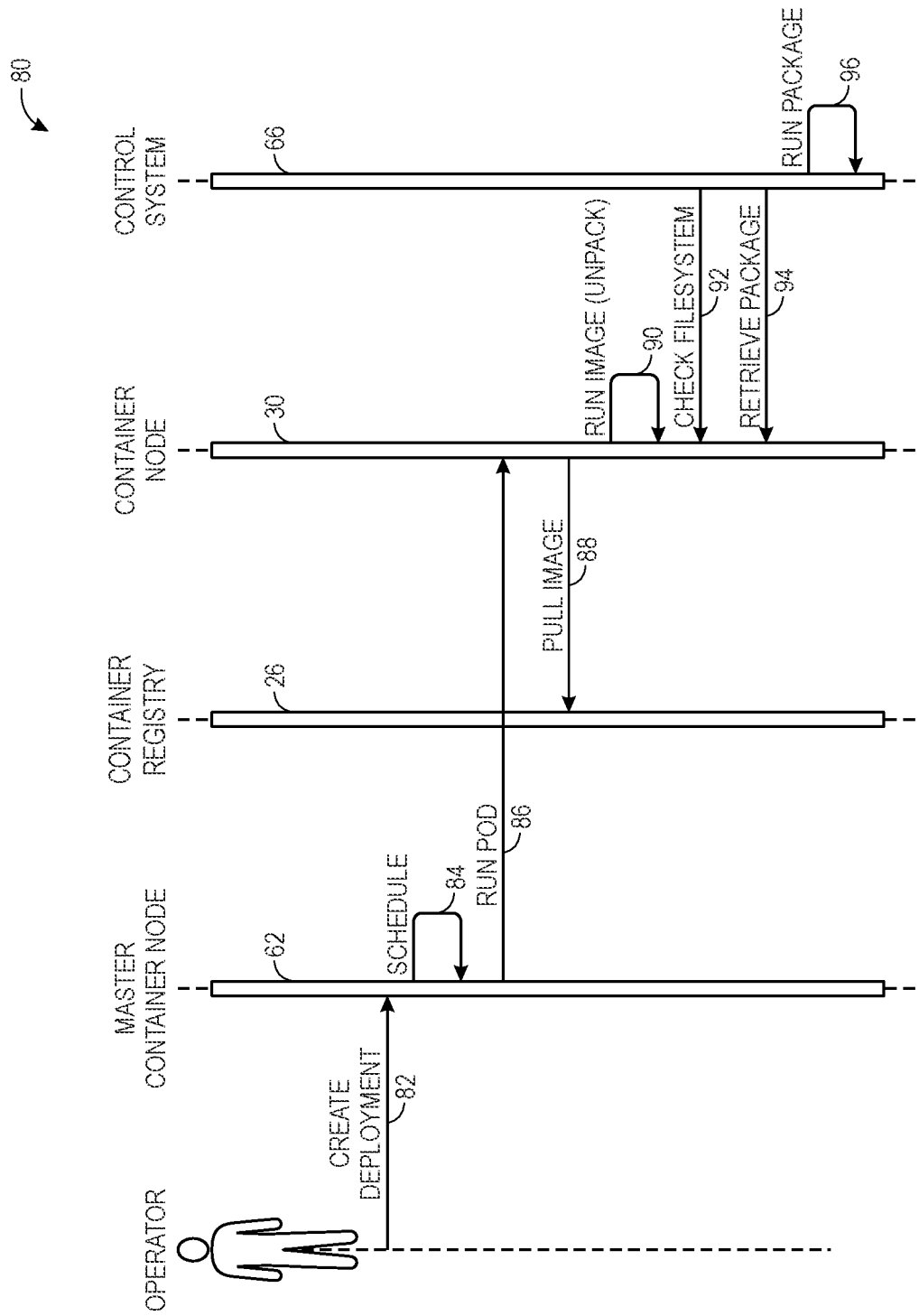
FIG. 4 is a sequence diagram illustrating the deployment of container pods to industrial control systems in the OT network of FIG. 3, in accordance with an embodiment.

FIG. 4 illustrates a sequence diagram 80 that tracks the deployment of a container using the master container node 62 and the container node 30 described above with reference to FIG. 3. At step 82, the IDE tool 64 may create a deployment of the deployment configuration file 65 to the master container node 62. After receiving the deployment configuration file 65, the master container node 62 may identify a container node 30 that may fit the constraint specifications (e.g., memory, CPU availability) provided in the deployment configuration file 65. That is, the master container node 62 performs scheduling operations that involve checking the state data for each node of the container orchestration system 24, determining whether a suitable node exists for the constraints provided in the deployment configuration file 65, and the like.

After identifying the suitable container node, at step 84, the master container node 62 may schedule the deployment of the container to the respective container node 30. At step 86, the master container node 62 may deploy a pod to the container node 30, which may cause the container node 30 to retrieve a container image 28 from the container registry 26 at step 88. In this way, the container node 30 is configured to receive pods from the master container node 62 and execute the pods, although the control system 66 of the industrial control system 12 may not be able to execute the pod. After pulling the container image 28 from the container registry 26, the container node 30 may, at step 90, run the container image 28 or unpack the container image 28 and store an application or operation executable by the control system 66 in a file system. At step 92, the control system 66 may check the file system of the container node 30 for updates or newly stored packages. At step 94, the control system 66 may retrieve the stored package that may include the container scheduled for operation by the control system 66 by the master container node 62 at step 84. At step 96, the control system 66 may execute the package retrieved from the file system of the container node 30. The container node 30 may then monitor the operations of the package being executed on the control system 66, the state (e.g., memory, CPU usage) of the control system 66 and send updates to the master container node 62. If the container node 30 sends an update indicative of the package no longer executing the package, the master container node 62 may schedule deployment of another pod to another container node 30 for execution to maintain the desired state.

Figure 5:
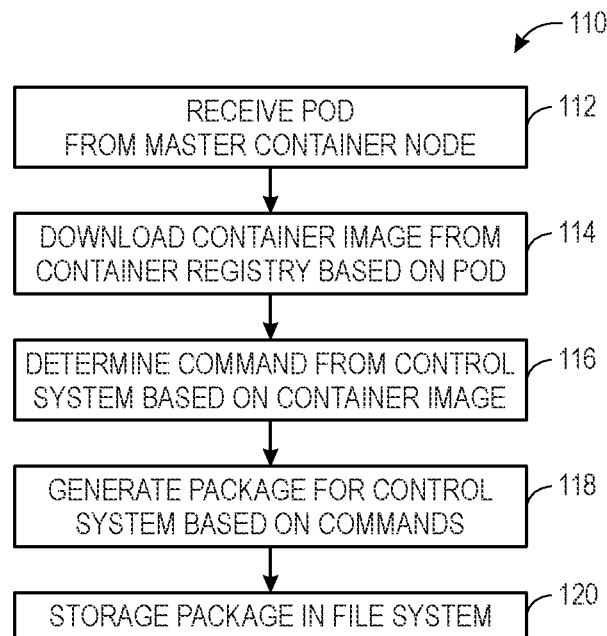
FIG. 5 is a flow chart of a method for the industrial control system implementing commands received via the control orchestration system, in accordance with an embodiment.

Keeping the foregoing in mind, FIG. 5 illustrates a method 110 in which the container node 30 may implement to coordinate activities via the master container node 62 of the container orchestration system 24. Although the following description of the method 110 is described as being performed by the container node 30, it should be understood that any suitable container node that is configured to interface with the cluster of nodes of the container orchestration system 24 and the industrial control system 12 may perform the operations described herein. In addition, although the method 110 is described in particular order, it should be understood that the method 110 may be performed in any suitable order.

Referring now to FIG. 5, at block 112, the container node 30 may receive a pod from the master container node 62. As mentioned above, pods may include one or more containers that are deployed to a host (e.g., container node 30). In some embodiments, the pod may operate to specify coordinated operations between a group of containers. The pod may include an indication or reference to a storage location for one or more container images 28 related to the pod. In some embodiments, the container images 28 may be stored in the container registry 26. As such, the pod may provide an indication of a network address or other address for accessing a memory location in the container registry 26.

After receiving the pod from the master container node 62, at block 114, the container node 30 may download the related container images 28 from the container registry 26. The container image 28, as mentioned above, represents data that encapsulates an application and its software dependencies. The container images 28 may be executable software bundles that may execute as standalone software without regard to the operating system that the corresponding container node 30 is using. In some embodiments, the container node 30 may receive the container images directly from the container registry 26, via the master container node 62, or any other suitable communication schemes.

After receiving the container images 28, at block 116, the container node 30 may run or unpack the container images 28 and determine commands that may be performed by the control system 66 based on the container images 28. That is, the container images 28 may include software applications that are executable by container nodes 30. However, the software applications may not be executable by the control system 66. As such, the container node 30 may determine commands for the control system 66 that correspond to the software applications encapsulated in the container images 28. In some embodiments, certain operations in the software applications may be mapped to certain operations that may be performed by the control system 66. For example, software application commands for create, run, start, pause, stop, and delete may map to download, download/run, run, idle, and unload commands, respectively, which may be performed by the control system 66. In some embodiments, the control system 66 may be used to perform a macro batch control sequence.

After determining the commands that may be implemented by the control system 66 based on the container images 28, at block 118, the container node 30 may generate a package that may be retrieved and executed by the control system 66. That is, the container node 30 may organize or structure the determined commands into a software package that may be used by the control system 66. For example, if the control system 66 corresponds to a PLC, the package may be organized according to a programming structure (e.g. ladder logic) that the PLC may use to program itself.

At block 120, the container node 30 may store the package in a memory or filesystem that is accessible to the control system 66. In some embodiments, the container node 30 may not be capable of interfacing directly with the control system 66. However, the container node 30 may provide the control system 66 with access to its memory or storage components, such that the control system 66 may retrieve the stored package. The control system 66 may be programmed to periodically (e.g., daily, hourly) check the filesystem for updates or new packages available for downloading.

It should be noted that the method 110 may describe a passive-indirect mode of operation for the container node 30 as part of the container orchestration system 24. That is, the container node 30 is limited to performing a subset of commands that may be provided by the master container node 62, as opposed to performing all of the commands that nodes that are part of the container orchestration system 24 are capable of performing. Moreover, the container node 30 may not be able to perform all of the lifecycle operations provided in a container. For example, the container node 30 may facilitate a package download operation for the control system 66, as described above, but it may not be able to perform every function specified in the container if the control system 66 does not have a corresponding operation that can be mapped to the respective container lifecycle operation.

In some embodiments, the container node 30 may operate in a passive-direct mode of operation in which the container node 30 may participate as a node in the container orchestration system 24. As such, the container node 30 may support a full set of container lifecycle operations. That is, since the control system 66 may be capable of implementing a limited set of commands provided by the master container node 62, the container node 30 may be implemented or executed by a sidecar compute module that may host a container host daemon that may perform the full suite of operations that a node in the container orchestration system 24 may perform. As such, the sidecar compute module may be any suitable computing system that is capable of executing an operating system (OS), such that commands received from the master container node 62 may be implemented by the respective sidecar compute module.

By implementing the container node 30 in the sidecar compute module, the container node 30 may be operating as a node that is part of the container orchestration system 24 but operating in the OT space. As a result, the container node 30 may extend the functions available via the container orchestration system 24 to OT devices 67 that are not typically visible to the master container node 62 of the container orchestration system 24. To operate in the passive-direct mode, the container node 30 may include applications and/or APIs that interface directly with the control system 66 and the master container node 62. As such, the container node 30 may provide a bi-directional bridge of communication between the control system 66 and the master container node 62. In some embodiments, the container node 30 may include an API that translates the OT data received from the control system 66 into IT data that may be interpretable by the master container node 62. As such, the container node 30 may provide the master container node 62 with visibility into the operations and states of the OT devices 67 operating in the OT space.

Figure 6:
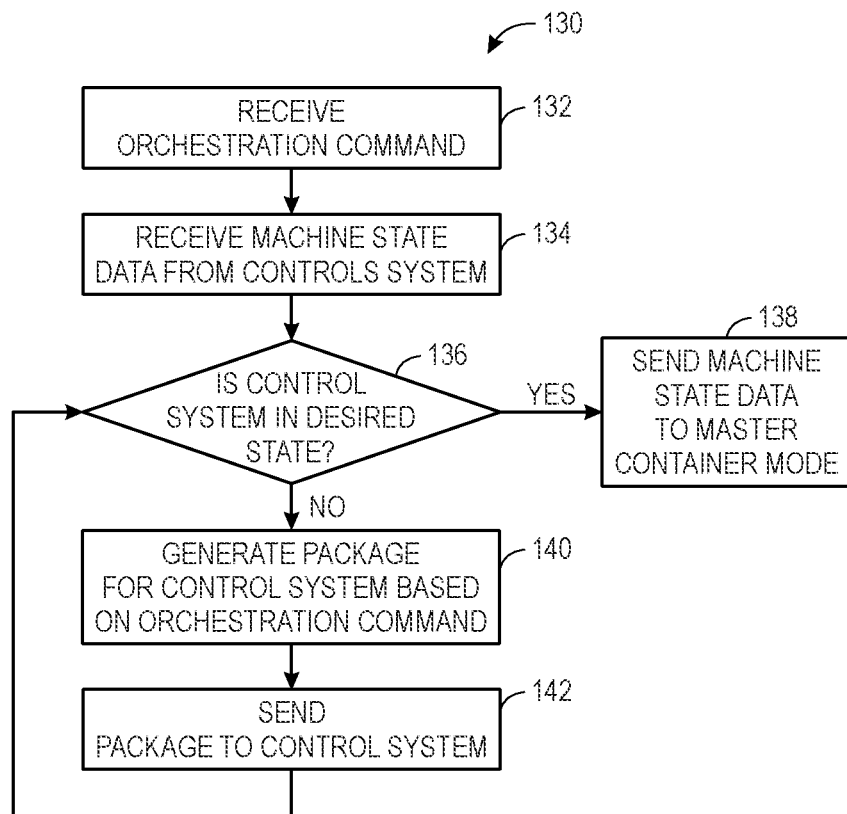
FIG. 6 is a flow chart of a process for the industrial control system actively implementing commands received via the control orchestration system, in accordance with an embodiment.

With this in mind, FIG. 6 illustrates a method 130 for the container node 30 directly sending packages to the control system 66 and machine state data to the master container node 62 in accordance with embodiments described herein. Like the method 110 described above, the following description of the method 130 may be performed by any suitable computing system and any suitable order. It should be noted that the method 130 described below corresponds to operating the container node 30 in the passive-direct mode of operation. As such, the container node 30 may receive and interpret orchestration commands received from the master container node 62 or the like and directly interface with the control system 66 to verify that the control system 66 is operating at the desired state.

Referring to FIG. 6, at block 132, the container node 30 may receive an orchestration command from the master container node 62 or some other node that is part of the container orchestration system 24. The orchestration command may include an instruction regarding one or more containers that the control system 66 should currently be executing. As such, the orchestration command may be part of a monitor function that causes the container node 30 to verify that the machine state data of the control system 66 corresponds to an expected machine state, as specified by the deployment configuration file 65.

At block 134, the container node 30 may retrieve machine state data from the control system 66. The machine state data may include current operational state (e.g., active, inactive) of the respective OT device controlled by the control system 66, available processing resources (e.g., CPU availability), available memory resources (e.g., storage, RAM), and the like. The machine state data may also indicate whether any containers are being executed by the control system 66. As such, the machine state data may be reported back to the master container node 62 to ensure that the desired state specified by the deployment configuration file 65 is present.

To receive the machine state data, the container node 30 may send requests to the control system 66 via an appropriate OT communication protocol. In response to receiving the requests, the control system 66 may query a database, memory cell, or other suitable storage that may include information regarding the requested data. After retrieving the requested information, the control system 66 may send the requested data to the container node 30 using the same OT communication protocol on which it received the request.

In some embodiments, the container node 30 may be embedded or integrated into one or more cores of the control system 66. As such, the container node 30 may communicate data with portions of the control system 66 using onboard communication methodologies. Alternatively, the container node 30 may directly retrieve the machine state data from the respective memory locations.

After receiving the machine state data from the control system 66, the container node 30 may, at block 136, determine whether the control system 66 is operating at a desired state based on the deployment configuration file 65. In the present embodiment, the container node 30 may evaluate whether the control system 66 is executing the containers, as specified in the deployment configuration file 65. That is, since the container node 30 may execute the container daemon host, the container node 30 may participate in the management of the containers distributed throughout the container orchestration system 24 by monitoring the machine state data of the control system 66.

If the control system 66 is operating in the desired state, the container node 30 may proceed to block 138 and send the machine state data to the master container node 62. The master container node 62 may then check whether other container nodes 30 are achieving the desire states.

If, however, the container node 30 determines that the control system 66 is not operating in the desired state, the container node 30 may proceed to block 140 and generate a package that may cause the control system 66 to modify its operations to execute the corresponding pod and the containers therein. After generating the package, the container node 30 may send the package directly to the control system 66 to execute. In this way, the container node 30 operates in the passive-direct mode because the container node 30 may directly send commands that cause the control system 66 to change operations. For example, instead of the control system 66 periodically checking the filesystem, as described above with respect to FIG. 5 (e.g., passive-indirect mode), the control system 66 may directly interface with the container node 30 and receive commands that may cause it to adjust operations of a connected device (e.g., OT device), execute received packages, and the like. As such, the container node 30 may push packages, firmware updates, OT device credential updates, security updates, encryption keys, and other data to the control system 66 at any given time. That is, the container system 30 may generate an event notification that causes an API or other component of the control system 66 to react in response to detecting the event notification. In other embodiments, the container node 30 may determine that it is safe to perform certain actions, such as changing state to download a firmware update, perform maintenance/service, etc. In this way, the container node 30 may actively participate in the coordination of containers with a respective control system 66 based on orchestration commands received passively from the master container node 62 or the like.

By employing the container nodes 30 to enable the container orchestration system 24 to implement software containers on control systems 66, the present embodiments described herein may allow for coordinating control of a number of control systems 66 and a number of OT devices 67 to control operations in the industrial automation system 10. That is, desired machine states may include desired operating parameters for industrial equipment, and the container orchestration system 24 may monitor the available industrial equipment resources to ensure that the desired machine states are continuously being achieved by coordinating activities via the container nodes 30 communicatively coupled to the control systems 66.

In addition to operating in the passive-indirect mode and the passive-direct mode, the container node 30 may operate in an active mode, such that the container node may invoke container orchestration commands for other container nodes 30. For example, referring back to FIG. 3, a proxy node 32 may operate as a proxy or gateway node that is part of the container orchestration system 24. The proxy node 32 may be implemented in a sidecar computing module that has an operating system (OS) that supports the container host daemon. In another embodiment, the proxy node 32 may be implemented directly on a core of the control system 66 that is configured (e.g., partitioned), such that the control system 66 may operate using an operating system that allows the container node 30 to execute orchestration commands and serve as part of the container orchestration system 24. In either case, the proxy node 32 may serve as a bi-directional bridge for IT/OT orchestration that enables automation functions to be performed in IT devices based on OT data and in OT devices 67 based on IT data. For instance, the proxy node 32 may acquire OT device tree data, state data for an OT device, descriptive metadata associated with corresponding OT data, versioning data for OT devices 67, certificate/key data for the OT device, and other relevant OT data via OT communication protocols. The proxy node 32 may then translate the OT data into IT data that may be formatted to enable the master container node 62 to extract relevant data (e.g., machine state data) to perform analysis operations and to ensure that the container orchestration system 24 and the connected control systems 66 are operating at the desired state. Based on the results of its scheduling operations, the master container node 62 may issue supervisory control commands to targeted OT devices via the proxy nodes 32, which may translate and forward the translated commands to the respective control system 66 via the appropriate OT communication protocol.

In addition, the proxy node 32 may also perform certain supervisory operations based on its analysis of the machine state data of the respective control system 66. As a result of its analysis, the proxy node 32 may issue commands and/or pods to other nodes that are part of the container orchestration system 24. For example, referring to FIG. 3, the proxy node 32 may send instructions or pods to other worker container nodes 68 that may be part of the container orchestration system 24. The worker container nodes 68 may corresponds to other container nodes 30 that are communicatively coupled to other control systems 70 for controlling other OT devices 71. In this way, the proxy node 32 may translate or forward commands directly to other control systems 70 via certain OT communication protocols or indirectly via the other worker container nodes 68 associated with the other control systems 70. In addition, the proxy node 32 may receive replies from the control systems 70 via the OT communication protocol and translate the replies, such that the nodes in the container orchestration system 24 may interpret the replies. In this way, the container orchestration system 24 may effectively perform health checks, send configuration updates, provide firmware patches, execute key refreshes, and provide other services to OT devices 71 in a coordinated fashion. That is, the proxy node 32 may enable the container orchestration system to coordinate the activities of multiple control systems 66 and 70 to achieve a collection of desired machine states for the connected OT devices 67 and 71.

The importance of a container node's 30, 68 proximity to a respective OT device 67, 71 that collected data being processed may vary based on characteristics of the data being collected and/or the type of analysis being performed. For example, if data collected from an OT device 67 is at a frequency that is above some threshold frequency, or the time window for performing analysis is below some threshold amount of time, it may be beneficial to push the analysis closer to the OT device 67 and reduce latency by deploying the container node 30 to a compute surface in relatively close proximity (e.g., less than some threshold distance) to the OT device 67 or to compute fabric within the OT device 67. Correspondingly, if data collected from an OT device 71 is at a frequency that is below some threshold frequency, and/or the time window for performing analysis is above some threshold amount of time, or otherwise not constrained, a container node 68 may be deployed at a further distance (e.g., more than some threshold distance) from the OT device 71. For example, in embodiments in which analysis is not particularly time sensitive, other factors, such as resource allocation, resource availability, load balancing, and so forth may carry more weight in decisions regarding where to deploy containers than proximity to a respective OT device. Accordingly, container functions may be deployed to different locations or devices based on the type of information that is being collected.

For example, for container functions that perform tasks at a high speed or high frequency, containers may be deployed to compute surfaces and/or devices (e.g., container node 30) close (e.g., within a threshold distance) to the source of the data (e.g., OT device 67), or to compute surfaces within the source of data, in order to reduce the communication latencies involved with transmitting and receiving the acquired/sampled data. However, for container data operations that do not happen at high speed or involve high frequency data, containers may be deployed on compute surfaces (e.g., worker container node 68) further away from a data source (e.g., OT device 67). For instance, data acquired at some rate greater than a threshold rate (e.g., every 10 milliseconds) may be processed using a container deployed in edge devices that may not be the closest compute surfaces to the OT device 67. In such cases, containers may be deployed to compute surfaces within an OT network to efficiently process the acquired data, while maximizing efficient usage of the available computational resources of the respective compute surfaces. As a result, the container deployment system may maximize the available compute space by pushing functions to locations or spaces that are capable of performing tasks that are uniquely identified for the respective space.

Figure 7:
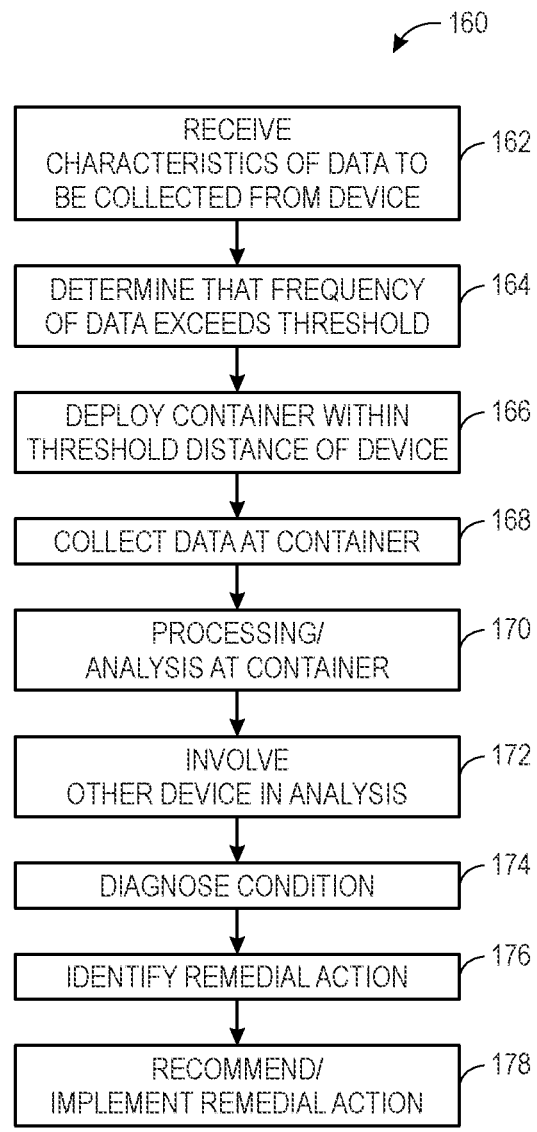
FIG. 7 is a flow chart of a process for using containers to perform computing functionality in the OT network of FIG. 3, in accordance with an embodiment.

With the foregoing in mind, FIG. 7 is a flow chart of a process 160 for using containers to perform computing functionality in an OT network. As used herein, the computing functionality performed by containers deployed within the OT network may span a broad spectrum of activities. For example, in some embodiments, containers may be deployed within an OT network in response to a detected and/or reported problem to troubleshoot the problem. For example, a controller or application container for an actuator in an OT network may generate an alert when a problem is encountered and a container deployed to troubleshoot the problem. This may include, for example, collecting data, analyzing the data, performing one or more tests, diagnosing the problem, and either automatically resolving the problem (e.g., by adjusting one or more operating parameters), or recommending a remedial action to be approved and/or implemented by a user. In other embodiments, containers may be deployed to perform maintenance operations and/or determine whether an OT device is ready for, or in need of, maintenance. In further embodiments, containers may be deployed within an OT network to perform calibrations and/or to check the calibrations of devices. Containers may further be deployed within an OT network in response to a condition being detected or an alert being generated. In some embodiments, containers may be deployed within an OT network at the request of a user (e.g., device was making an unusual noise, etc.) to inspect the OT device. Along these lines, in some embodiments, containers may be deployed within an OT network to perform inspections of devices, at startup and/or shutdown, at regular intervals, upon the device being at a given point in a maintenance/service/calibration cycle, reaching a lifecycle milestone, a number of cycles passing, an amount of time passing, and so forth.

At block 162, one or more characteristics of data to be collected from a device are received. This may include, for example, a frequency of data points, a frequency of data point collection, a sampling rate, a time constant of a control loop, a time period for feedback, and so forth. At block 164, the process 160 determines whether the one or more characteristics of the data to be collected meet certain conditions and/or criteria. For example, the process 160 may determine whether a frequency is above a threshold level, whether a sampling rate is above a threshold level, whether a time constant is below a given threshold, whether a time period for feedback is below a threshold level, and so on. In some embodiments, at block 164, the process 160 may determine where the one or more characteristics of the data to be collected fall into some binary framework (e.g., above or below a threshold value). In other embodiments, the process 160 may determine where the one or more characteristics of the data to be collected fall into along a spectrum of categories. For example, the process 160 may use the one or more characteristics of the data to be collected to classify the data to be collected into at least one of one or more categories or classifications. This may include, for example, comparing the one or more characteristics to one or more threshold values, one or more ranges of values, applying an algorithm, etc. In such embodiments, the categories or classifications may determine a proximity of the compute surface on which the container runs to the data source. Accordingly, in one example, the one or more characteristics falling into a first category may indicate that the compute surface on which the container runs should be disposed as close as possible to the data source, the one or more characteristics falling into a second category may indicate that the compute surface on which the container runs should be disposed within a first proximity to the data source, the one or more characteristics falling into a third category may indicate that the compute surface on which the container runs should be disposed within a second proximity to the data source, and the one or more characteristics falling into a fourth category may indicate that the compute surface on which the container runs may be disposed at any proximity to the data source. In some embodiments, the container deployment system may generate a visualization that may provide a visual indication of any detected alert and provide options with regard to locations in which certain containers may be deployed to assist in resolving the issue. Inputs may then be received specifying where and how containers are to be deployed. Indeed, the container deployment system may also provide a list of options for the types of containers that may be useful in resolving or attempting to resolve the detected issue. The visualization may provide a user the ability to manage the deployment of any of the tasks previously described.

At block 166, the process 160 identifies compute surfaces at which to deploy one or more containers that are within the threshold distance/proximity identified at block 164 and deploys the one or more containers to the identified compute surfaces. In some embodiments, the container may be deployed to the compute fabric of the data source (e.g., OT device) itself. The distance/proximity of the compute surface to the data source may be expressed in terms of physical distance, network distance (e.g., the length of the shortest path between two locations along the network, where the shortest path is computed based on travel weight, such as travel distance or travel time, of network edges), network communication latency, logical distance, degrees of communication (e.g., number of intervening network components), and so forth. In identifying the compute surface to which to deploy the container from a group of candidate compute surfaces, the process 160 may consider available memory/processing/compute resources, resource allocation, load balancing, location within network, proximity to data source, and so forth. As previously discussed, deploying the container to the identified compute surface may include, for example, transmitting a container image to the compute surface and running the container as set forth in a deployment configuration file.

At block 168, the container collects data from the data source (e.g., OT device). In some embodiments, the container may pull data from the data source, whereas in other embodiments, the data source may push data to the container. In further embodiments, the data source may push data to an intermediate storage device (e.g., another container, a compute surface, etc.), from which the container may pull data. Data may be transmitted in a continuous stream, or in batches. In embodiments in which data is transmitted in batches, batches of data may be transmitted on a schedule, on demand, in response to some triggering event or condition, upon a batch of data reaching a certain size (e.g., amount of memory occupied by the data, number of records, etc.), and so forth. In some embodiments, the collected data may be representative of how the OT device is performing its intended function and/or conditions in/around the OT device. However, in some embodiments, the monitored data may be representative of total cost of ownership (TCO) statistics based on monitoring the operations of various devices and comparing the collected data to actual or projected data from replacement options that were previously offered, that are currently being offered, will be offered in the future, or the like. In the same manner, container may be used to track and report energy costs.

At block 170, the container performs processing and/or analysis on the collected data. The processing/analysis may include, for example, running a script on the collected data, applying an algorithm to the collected data, providing the collected data to a machine learning or artificial intelligence model, diagnosing a condition of the data source or a process being performed by the data source (e.g., machine jams, capping anomalies, etc.), generating a signature of the data source, recommending remedial actions (e.g., maintenance operations, changes to operating parameters, recalibration, part replacement, etc.), filtering data, pre-processing data, etc. In other embodiments, for example, the deployed container may be used to conduct or monitor a quality check, detect that a produced product has failed the quality check and transmitting a notification and/or instructions to reject the part. Accordingly, in some embodiments, the deployed containers may evaluate products produced by the OT device rather than the OT device itself.

In some embodiments, the processing/analysis may not be performed entirely by the container. For example, the processing/analysis may utilize resources (e.g., machine learning models, analysis engines, etc.) running on other devices. In some cases, the resources may be outside the scope of the container's capabilities, or it may be impractical to run the resources on the container. In other embodiments, it may be more efficient to run the resources in a centralized location, available to multiple containers are/or devices instead of having duplicative instantiations of resources running in multiple locations throughout an OT network. Accordingly, in some embodiments, at block 172, the process 160 may involve one or more other devices in the analysis. This may include, for example, transmitting data to the one or more other devices for additional data analysis, mining, model creation, analytics, etc., and then receiving responses from the one or more other devices. For example, the container may provide data to another device running a machine learning classifier to classify the data and return assigned classes and confidence scores associated with the assigned classes. In other embodiments, data may be transmitted to another device running a model, the transmitted data input to the model and the outputs of the model transmitted back to the container. In some embodiments, raw data, pre-processed data, down-sampled data, etc. may be transmitted for another device or to the cloud for processing/analysis (e.g., in real-time, near-real time, or on a delay, with or without a response expected). The transmitted data may be indicative of the health of the OT device, or product produced by the OT device. It should be understood, however, that in some embodiments, the processing/analysis may take place entirely on the container. In such embodiments, block 172 may be omitted from the process 160.

At block 174, the process 160 diagnoses a condition of the data source based on the processing/analysis. For example, the process 160, as a result of the analysis, may identify a condition of one or more OT devices within the network. For example, the condition may include worn bearings, machine jams, capping anomalies, a broken rotor bar, contamination, a defective heating element, a broken seal, a malfunctioning sensor, the presence of malware, ransomware, or spyware, an oil leak, dirty oil, a blown fuse, out of date firmware or software, a bound actuator, a fluid spill, a broken mover, a ruptured hose, damaged product, a stopped conveyor, and so forth. At block 176, the process 160 identifies one or more remedial actions to address the diagnosed condition. The one or more remedial actions may be identified by the container or by another device (e.g., a device involved in the analysis, or a different device). The diagnosis and identification remedial actions may be performed via a lookup table, a script, an algorithm, a machine learning model, accessing a database, following a workflow or decision tree, analyzing historical data, and so forth. The remedial actions may include, for example, replacing and/or servicing bearings, clearing a machine jam, adjusting fasteners, replacing a seal, replacing one or more parts, cleaning a spill, restarting a component, replacing a seal, performing a maintenance operation, replacing oil or lubrication, replacing a hose or conduit, recalibrating a component, updating software/firmware, and so forth.

In some embodiments, the process 160 may be configured to automatically implement remedial actions. For example, certain remedial actions may be pre-approved for automatic implementation, or the remedial actions may be determined to be of small enough risk to justify automatic implementation. In other embodiments, the process 160 may propose one or more remedial actions to a user for approval/selection before implementation (block 176). Further, other remedial actions (e.g., replacing a seal, replacing a component, clearing a machine jam, replacing a hose) may be suggested to a user for the user to carry out themselves or oversee someone else (e.g., a technician) carry out. If the condition persists or is otherwise unresolved, some or all of the steps may be repeated with a different diagnosis and/or remedial action. After the condition has been resolved (e.g., a confirmation is received that the condition has been resolved and the OT device is operating as expected), the container may be spun down or otherwise stopped so the resources utilized by the container can be made available for other functions.

Figure 8:
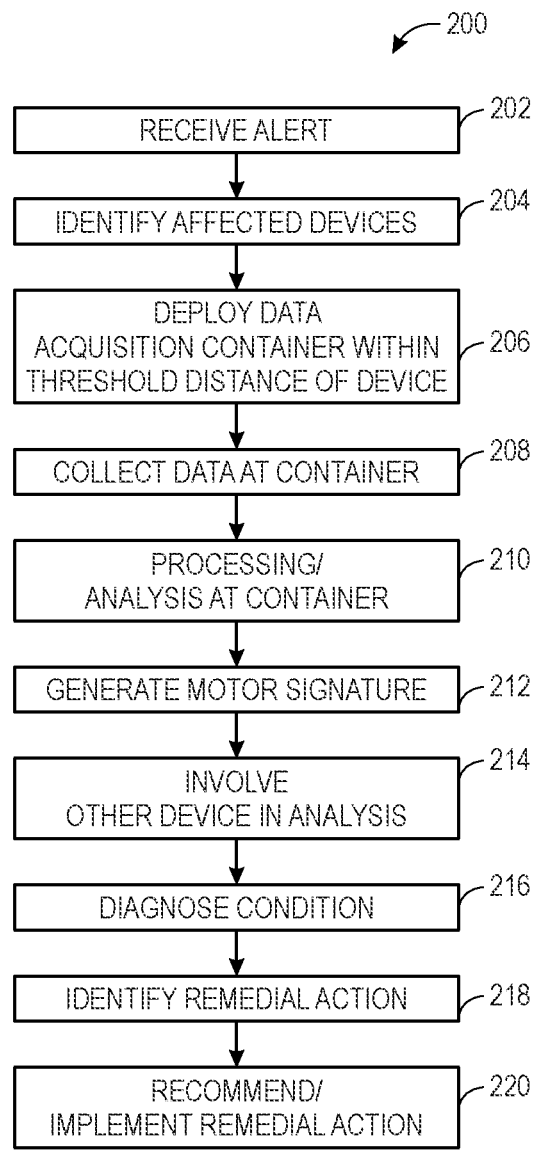
FIG. 8. is a flow chart of a process for using containers to diagnose a condition in a motor in the OT network of FIG. 3, in accordance with an embodiment.

FIG. 8 is a flow chart of a process 200 for using containers to diagnose a condition in a motor in an OT network. At block 202, an alert is received that is indicative of the motor experiencing a problem or a condition. The alert may be generated by the motor itself, a controller communicatively coupled to the motor, by another container, such as an application-specific container monitoring operation of the motor, a sensor monitoring one or more aspects of the motor's performance of an industrial automation function or one or more conditions around the motor, an edge device disposed in the OT network, a cloud-based computing device that monitors one or more aspects of the motor, or some other device within the OT network. At block 204, the process 200 identifies the one or more affected devices within the OT network. In some embodiments, the affected devices may be limited to the motor itself, whereas in other embodiments, the affected devices may include other devices around the motor, upstream of the motor, downstream of the motor, adjacent to the motor, or otherwise in the vicinity of the motor. Affected devices may be identified in the alert itself, may be identified in additional alerts, may be assumed to be affected based on an analysis of the alert (e.g., using historical data, system topology information, etc.), may be identified by collected data from nearby devices and identifying anomalies, and so forth. As part of block 202, the process 200 may also classify data to be collected from the affected devices and determine a proximity at which to deploy data acquisition containers.

Some application-specific containers may be deployed to perform specific types of functions (e.g., artificial lifts) for a consumer. Since these types of containers may not be used by most consumers, application-specific containers often rely on shared data sources to obtain data used for performing the respective function. However, the shared data sources (e.g., database, storage, etc.) may not provide a sufficient level of detail or granularity to effectively perform the function. With this in mind, the container deployment system may coordinate with the application specific container to deploy data acquisition containers closer to the respective data sources to acquire data that may be passed directly to the application specific container. Accordingly, at block 206, the process 200 identifies one or more compute surfaces at which to deploy one or more data acquisition containers that are within a threshold distance/proximity identified at block 204 and deploys the one or more data acquisition containers to the one or more identified compute surfaces within the threshold proximity (e.g., network distance) of one or more of the affected devices. In some embodiments, the one or more data acquisition containers may be deployed to compute surfaces of the one or more affected devices. In identifying the compute surface to which to deploy the container from a group of candidate compute surfaces, the process 200 may consider available memory/ processing/compute resources, resource allocation, load balancing, location within network, proximity to data source, and so forth. As previously discussed, deploying the container to the identified compute surface may include, for example, transmitting a container image to the compute surface and running the container as set forth in a deployment configuration file.

At block 208, the data acquisition container collects data (e.g., high frequency data) from the one or more affected devices. For example, in the embodiment in which one or more containers are used to collect data from a motor experiencing a problem or a condition and diagnose the problem or condition, the data collected from the motor may include phase A, phase B, phase C, and ground current measurements, or some combination thereof. In some embodiments, the data collected may include an input signal, an output signal, or data from a sensor in or around the motor. The data acquisition container may pull data from the device, the device may push data to the data acquisition container, or the device may push data to an intermediate storage device, from which the data acquisition container pulls the data. Data may be transmitted in a continuous stream, or in batches (e.g., on a schedule, on demand, in response to some triggering event or condition, upon a batch of data reaching a certain size, such as an amount of memory occupied by the data, a number of records, etc.).

At block 210, the data acquisition container performs processing and/or analysis on the collected data, such as running a script on the collected data, applying an algorithm to the collected data, providing the collected data to a machine learning or artificial intelligence model, filtering data, pre-processing data, etc. At block 212, a motor signature is generated based on the collected data. A motor signature can be generated based on current measurements (phase A current, phase B current, phase C current, ground current, or any combination thereof) from an induction motor and analyzed to diagnose conditions of the motor (e.g., faults, out of balance, misalignment, worn bearings, rotor bar damage, load issues, dynamic eccentricity, static eccentricity, cavitation, component wear, etc.) without stopping or otherwise affecting operation of the motor.

As discussed previously, the processing/analysis may not be performed entirely by the data acquisition container. Data acquisition containers for any suitable analog or floating point values may acquire useful information related to solving an issue, but the computing resources associated with these containers may prove to be significant. As such, the container deployment system may deploy data acquisition containers for assistance in resolving certain issues or suspected conditions. For instance, machine jams, capping anomalies (e.g., fasteners threaded correctly, with correct torque), and other situations may benefit from high frequency data acquisition to quickly diagnose and resolve the issue. Indeed, as machine speeds increase, patterns within the acquired data may be identified at higher frequencies. However, resources used to diagnose and resolve certain conditions may be outside the scope of what is practical with a data acquisition container deployed in close proximity to the motor. Accordingly, processing/analysis may utilize resources running on other devices, such as machine learning models, analysis engines, and so forth. In some embodiments, at block 214, the process 200 may involve one or more other devices, such as edge devices, in the analysis. This may include, for example, transmitting data (e.g., collected data and/or motor signatures) to the one or more other devices and then receiving responses from the one or more other devices. For example, the data acquisition container may provide data to an edge device or other device to classify and/or categorize the signature to assess or correlate the signature to known events (e.g., broken rotor bar, bearing wear, faults, misalignment, worn bearings, load issues, dynamic eccentricity, static eccentricity, cavitation, component wear, etc.). The edge device may return assigned classes, confidence scores associated with the assigned classes, diagnoses, and/or suggested remedial actions. In other embodiments, data may be transmitted to another device running a model, the transmitted data input to the model and the outputs of the model transmitted back to the data acquisition container. It should be understood, however, that in some embodiments, the processing/analysis may take place entirely on the data acquisition container. In such embodiments, block 214 may be omitted from the process 200.

At block 216, the process 200 diagnoses a condition of the motor based on the processing/analysis. For example, the process 200, as a result of the analysis of the collected data and/or the motor signature, may identify a condition of the motor (e.g., faults, out of balance, misalignment, worn bearings, rotor bar damage, load issues, dynamic eccentricity, static eccentricity, cavitation, component wear, machine jams, capping anomalies, contamination, a broken seal, a malfunctioning sensor, the presence of malware, ransomware, or spyware, an oil leak, dirty oil, a blown fuse, out of date firmware or software, and so forth. The diagnosis may be made using machine learning, historical data, workflows, decision trees, lookup tables, or some combination thereof.

At block 218, the process 200 identifies one or more remedial actions to address the diagnosed condition or the motor. The one or more remedial actions may be identified by the data acquisition container or by another container or device (e.g., a device involved in the analysis, such as an edge device, or a different device). The remedial actions may be determined via a lookup table, a script, an algorithm, a machine learning model, accessing a database, following a workflow or decision tree, analysis of historical data, and so forth. The remedial actions may include, for example, replacing and/or servicing bearings, clearing a machine jam, adjusting fasteners, replacing a seal, replacing or repairing a rotor bar, replacing one or more parts, cleaning a spill, restarting a component, replacing a seal, performing a maintenance operation, replacing oil or lubrication, recalibrating a component, updating software/firmware, and so forth.

In some embodiments, the process 200 may be configured to automatically implement remedial actions. For example, certain remedial actions may be pre-approved for automatic implementation, or the remedial actions may be determined to be of small enough risk to justify automatic implementation. In other embodiments, the process 200 may propose one or more remedial actions to a user for approval/selection before implementation (block 220). Further, other remedial actions (e.g., replacing a seal, replacing a component, clearing a machine jam, replacing a hose) may be suggested to a user for the user to carry out themselves or oversee someone else (e.g., a technician) carry out. If the condition persists or is otherwise unresolved, some or all of the steps may be repeated with a different diagnosis and/or remedial action. After the condition has been resolved (e.g., a confirmation is received that the condition has been resolved and the OT device is operating as expected), the container may be spun down or otherwise stopped so the resources utilized by the container may be made available for other functions.

The present disclosure is generally directed toward analyzing a characteristic of data to be collected from an OT device within an OT network and, if the characteristic exceeds a threshold value, deploying a container to a compute surface within a threshold distance of the OT device. In some cases, the characteristic may be identified by, or otherwise determined based on, an alert generated by the OT device, a controller, an application-specific container, etc. The characteristic may include a frequency of data points, a frequency of collection, a sampling rate, a time constant of a control loop, a time period for feedback, and so forth. Once deployed, the container is configured to collect data from the OT device and analyze the collected data. The analysis may involve, for example, generating a motor signature, or performing other analysis. In some cases, the container may pre-process or partially process the data and then transmit the pre-processed or partially processed data to another compute surface, such as an edge device or a server for additional processing. In other cases, the processing/analysis may be performed entirely by the container. The container and/or the additional compute surface may diagnose a condition of the OT device and identify one or more remedial actions to address the condition. In some embodiments, the one or more remedial actions may be provided to a user for approval and/or manual performance. In other embodiments, the remedial actions may be automatically performed. After the condition has been resolved, the container may be spun down or otherwise stopped. By implementing these techniques, computing processes for high speed, high frequency, or other operations having a feedback loop with a short time constant, may be pushed closer to the OT device, reducing or eliminating the effects of communication latencies within the OT network on the ability of the industrial control system to optimize control of OT device. Accordingly, use of the disclosed techniques may improve product quality, process quality, and efficiency within the industrial automation system.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a plurality of devices configured to perform one or more operations within an industrial automation system, wherein each device of the plurality of devices comprises a compute surface configured to perform one or more software tasks; and
a processor configured to:
receive an alert associated with the one or more operations;
identify a portion of the plurality of devices, wherein each respective device of the portion of the plurality of devices comprises a respective data source configured to acquire a respective dataset related to the alert;
determine that a characteristic of a particular dataset of the plurality of datasets related to the alert exceeds a threshold value, wherein the characteristic comprises a frequency of one or more data points, a sampling rate, a time constant of a feedback loop, or any combination thereof; and
send a data acquisition container to each device of the portion of the plurality of devices, wherein each data acquisition container is configured to acquire the respective dataset from the respective data source of the respective device in the respective portion of the plurality of devices, wherein the data acquisition container configured to acquire the particular dataset runs on the respective compute surface of a particular device of the plurality of devices, wherein the particular device is within a threshold network distance of the data source.

2. The system of claim 1, wherein the processor is configured to generate a motor signature based on the respective dataset from the respective data source.

3. The system of claim 2, wherein the processor is configured to transmit the motor signature to an additional device of the plurality of devices, wherein the additional device is configured to diagnose a condition associated with the alert based on the motor signature.

4. The system of claim 3, wherein the additional device is configured to identify a remedial action to address the condition associated with the alert based on the motor signature, the diagnosed condition, or both.

5. The system of claim 2, wherein the processor is configured to:
diagnose a condition associated with the alert based on the motor signature; and
identify a remedial action to address the condition associated with the alert based on the motor signature, the diagnosed condition, or both.

6. The system of claim 1, wherein the alert is received from an application-specific container configured to perform at least one operation on one device of the plurality of devices.

7. A non-transitory computer-readable medium storing instructions that, when executed by a processor, cause the processor to perform operations comprising:
receiving, via the processor, a characteristic of data to be collected from an operational technology (OT) device disposed within an OT network associated with an industrial automation system configured to perform an industrial automation process, wherein the characteristic comprises a frequency of one or data points within the received data, a sampling rate, a time constant of a feedback loop, or any combination thereof;
determining, via the processor, that the characteristic exceeds a threshold value; and
deploying, via the processor, in response to determining that the characteristic exceeds the threshold value, a container to a compute surface within the OT network, wherein the compute surface is disposed within a threshold network distance of the OT device, wherein the container is configured to receive the data from the OT device and process the received data.

8. The non-transitory computer-readable medium of claim 7, wherein the container is configured to:
diagnose a condition of the OT device based on the received data; and identify a remedial action to address the condition of the OT device based on the received data, the condition, or both.

9. The non-transitory computer-readable medium of claim 8, wherein the processor is configured to implement the identified remedial action.

10. The non-transitory computer-readable medium of claim 8, wherein the processor is configured to cause a graphical user interface (GUI) to display an indication of the condition of the OT device and the identified remedial action.

11. The non-transitory computer-readable medium of claim 10, wherein the processor is configured to:
receive, via the GUI, an input indicative of an approval of the identified remedial action; and
implement the identified remedial action in response to receiving the input.

12. The non-transitory computer-readable medium of claim 7, wherein the container is configured to transmit at least a portion of the processed received data to an additional compute surface within the OT network, wherein the additional compute surface is configured to:
diagnose a condition of the OT device based on the processed data; and
identify a remedial action to address the condition of the OT device.

13. A method, comprising:
receiving, via a processor, a characteristic of data to be collected from an operational technology (OT) device disposed within an OT network associated with an industrial automation system configured to perform an industrial automation process, wherein the characteristic comprises a frequency of one or data points in the received data, a sampling rate, a time constant of a feedback loop, or any combination thereof;
determining, via the processor, that the characteristic exceeds a threshold value; and
deploying, via the processor, a container to a compute surface within the OT network, wherein the compute surface is within a threshold network distance of the OT device, wherein the container is configured to:
receive the data from the OT device;
performing one or more processing operations on the received data;
diagnose a condition of the OT device based on the processed received data; and
identify a remedial action to address the condition of the OT device based on the processed received data, the condition, or both.

14. The method of claim 13, wherein the container is configured to:
transmit the processed received data to an additional compute surface within the OT network for additional processing; and
receive a response from the additional compute surface, wherein the diagnosing the condition of the OT device, or the identifying the remedial action to address the condition of the OT device, or both, are based in part on the response received from the additional compute surface.

15. The method of claim 14, wherein the additional compute surface comprises an edge device.

16. The method of claim 14, wherein the one or more processing operations comprise generating a motor signature for the OT device.

* * * * *